United States Patent [19]
Warner

[11] Patent Number: 5,910,259
[45] Date of Patent: Jun. 8, 1999

[54] SYSTEM FOR MAKING MOTORS WITH CARBON COMMUTATOR ASSEMBLIES

[75] Inventor: Allan S. Warner, Clark, N.J.

[73] Assignee: Joyal Products, Inc., Linden, N.J.

[21] Appl. No.: 08/887,090

[22] Filed: Jul. 2, 1997

[51] Int. Cl.[6] .................................................. B23K 11/10
[52] U.S. Cl. ..................... 219/109; 219/56.22; 219/117.1
[58] Field of Search .............................. 219/85.22, 56.22, 219/89, 109, 110, 117.1, 120, 72; 310/237

[56] References Cited

U.S. PATENT DOCUMENTS

| | | | |
|---|---|---|---|
| 2,502,876 | 4/1950 | Mullen | 219/120 |
| 2,536,726 | 1/1951 | Cornwall | 219/120 |
| 3,327,087 | 6/1967 | Brumback, Jr. | 219/72 |
| 4,079,225 | 3/1978 | Warner | 219/110 |
| 4,224,496 | 9/1980 | Riordan et al. | 219/110 |
| 4,371,772 | 2/1983 | Szantho et al. | 219/89 |
| 4,439,658 | 3/1984 | Schmidt et al. | 219/120 |
| 5,157,299 | 10/1992 | Gerlach | 310/237 |
| 5,175,463 | 12/1992 | Farago et al. | 310/237 |
| 5,245,240 | 9/1993 | Takasaki | 219/56.22 |
| 5,255,426 | 10/1993 | Farago et al. | 310/237 |
| 5,264,674 | 11/1993 | Mangan et al. | 219/56.22 |

FOREIGN PATENT DOCUMENTS

| | | | |
|---|---|---|---|
| 65888 | 2/1914 | Germany | 219/72 |

*Primary Examiner*—Clifford C. Shaw
*Attorney, Agent, or Firm*—Edward Dreyfus

[57] ABSTRACT

A method and product of making a motor armature that includes a carbon disk or carbon barrel commutator subassembly with the carbon layer soldered to the metal commutators. The novel method includes, while fusing the armature wire segment to each metal commutator, applying cooling liquid to the commutator segment being fused and/or the fusing electrode in order to remove or reduce heat transfer to the solder layer. This technique yields many benefits to the process and product, including (1) overheating, flow, and beading of the solder is avoided, (2) temperature rise of the electrode and fused joint can be better controlled, (3) application of power and power consumption can be more uniformly achieved, and (4) better repeatability, yield, and quality of product can be achieved.

11 Claims, 4 Drawing Sheets

SYSTEM FOR MAKING MOTORS WITH CARBON COMMUTATOR ASSEMBLIES

BACKGROUND

Electric motors having face type carbon commutators have become popular for use in fuel pump assemblies for organic fuels, such as methanol, propane and the like, and for hydrocarbon mixtures including organic fuels, the mixture commonly known as gasohol. The typical motor of the flat disk type includes an armature with a plurality of electrically conductive base metals electrically insulated from each other but solidly secured in a body portion formed of insulating material. Carbon based protective members are soldered to the base metal members after the base metal surface is passified with a layer of another metal to assure a good bond between the solder, carbon and other metal layer. See for example, U.S. Pat. Nos. 5,245,240; 5,255,426; 5,175,463; and 5,157,299.

Conventional motors fitted with disk or face type carbon based commutators are known to experience various technical problems and expensive processing due to their design, costly materials, and excessive manufacturing difficulties and steps. For example, since the alcohol or other oxygenated constituent corrodes copper, the copper seat or base must be completely encapsulated in non-corrosive materials. Some conventional commutators include the carbon elements soldered directly to copper, nickel or other metal or alloy commutators. Alternatively, in order to assure good electrical and mechanical contact between these parts, a silver or metallized layer based metal layer is first coated on the copper based metal facing the carbon layer in order to avoid the need to passify the carbon before soldering. In either case, the silver layer or the passification of carbon adds to the cost of manufacturing and the cost of parts.

During subsequent steps of motor manufacturing, the motor winding wire is placed within the tang profile during the assembly of the conventional armature. The work then moves to a fusing station where a fusing machine applies heat, current and pressure to the tang, burns off or vaporizes the wire insulation beneath the tang, and creates a fixed fusion joint between the deformed tang and wire combination. Because of the low melting point of the solder layer in the vicinity of the tang, it is known that the solder will often run or liquify in response to the highly heated tang and metallic commutator zones. Attempts to localize this heat solely to the tang material external of the carbon profile have only been partially satisfactory making manufacturing quality control difficult and/or expensive.

Although the carbon protective commutator has great application in gasohol fuel pumps and the like, it is known that motor maintenance requirements are greatly reduced with these carbon based commutator brush contacts. Accordingly, there is a need to apply the carbon based brush contact to other motor applications and designs such as barrel type motor commutators for various other applications.

As can be seen from the following summary and detailed description, the present invention solves the forgoing technical and manufacturing problems and provides other benefits and advantages in the design, operation, and manufacturing of motors of these types.

The system according to the principles of the present invention solve the foregoing problems and provide other and further benefits.

SUMMARY OF EXEMPLARY EMBODIMENTS OF THE PRESENT INVENTION

The method and apparatus according to the principles of the present invention includes assembling an armature carbon track commutator subassembly of the type in which the carbon segments are held to the metallic commutator segments by solder, wrapping the insulated armature windings around respective commutator tangs and moving the assembly to a fusing station. The fusing station includes a single electrode or upper and ground electrodes as described below.

One exemplary method and apparatus of forming a fused tang/wire joint on a carbon commutator assembly according to the present invention includes moving the fusing electrode into contact with the assembled tang and insulated armature wire, applying fusing pressure to and current through the electrode to raise its temperature, and transferring said pressure and heat to the tang and wire, sensing the temperature of the fusing electrode or the tang/wire joint, when the electrode or tang temperature reaches a predetermined temperature, applying cooling liquid to the electrode and tang/wire joint.

This technique affords many advantages over the known methods of tang/wire connection for carbon commutators. For example, (1) the temperature rise of the electrode and work can be better controlled, (2) the overheating or heated flow of the solder layer is avoided, (3) application of power and power consumption is more uniformly achieved.

Various methods and apparatus can be used to apply cooling liquid. For example, a tube directed toward the electrode and tang being fused can spray or flood the area.

In one exemplary embodiment water is sprayed or flooded through a tube or hose arrangement directed to the electrode and/or joint.

Alternatively, a cup arrangement can be fitted to the front face of the commutator and cooling water forced through openings in the cup toward the front face to flow through the commutator slots and/or around to the sides and tangs of the commutator assembly and preferably on the hot fusing electrode as well.

If the fusing machine includes two electrodes, known as an upper electrode and a ground electrode, the upper electrode contacts the free leg of the tang and applies heat, current and pressure to the tang and wire within the tang. The ground electrode can contact either a grounding pad formed as part of and to the side of the tang, see for example U.S. Pat. No. 5,255,426, or the leg of the tang between the wire being fused and the commutator assembly. Fusing current flows through the upper electrode, through the tang and, once the wire insulation is vaporized or burned away, through the wire, thence through the lower tang leg and ground electrode toward ground potential. The voltage drop between the upper and ground electrode is very low albeit the fusing current is several thousand amps. Accordingly, water can be sprayed or flooded to the electrodes and commutator assembly without shorting or damaging parts of the machine or work.

According to another aspect of the present invention, an alternate embodiment of the fusing machine includes using a single fusing electrode instead of the two electrodes mentioned above. This alternate arrangement fosters a simplified tang design because no ground electrode pad or tang ground zone is needed and the fusing machine need include only one moveable electrode instead of two. Suitable fusing machines employing a single fusing electrode are disclosed in U.S. Pat. No. 5,264,674, owned by JOYAL Products, Inc. and incorporated herein by reference.

DESCRIPTION OF DRAWINGS

Other and further benefits and advantages afforded by the present invention will become apparent with the following description of exemplary embodiments when taken in view of the appended drawings, in which.

DETAILED DESCRIPTION OF EXEMPLARY EMBODIMENTS

Figure 1:
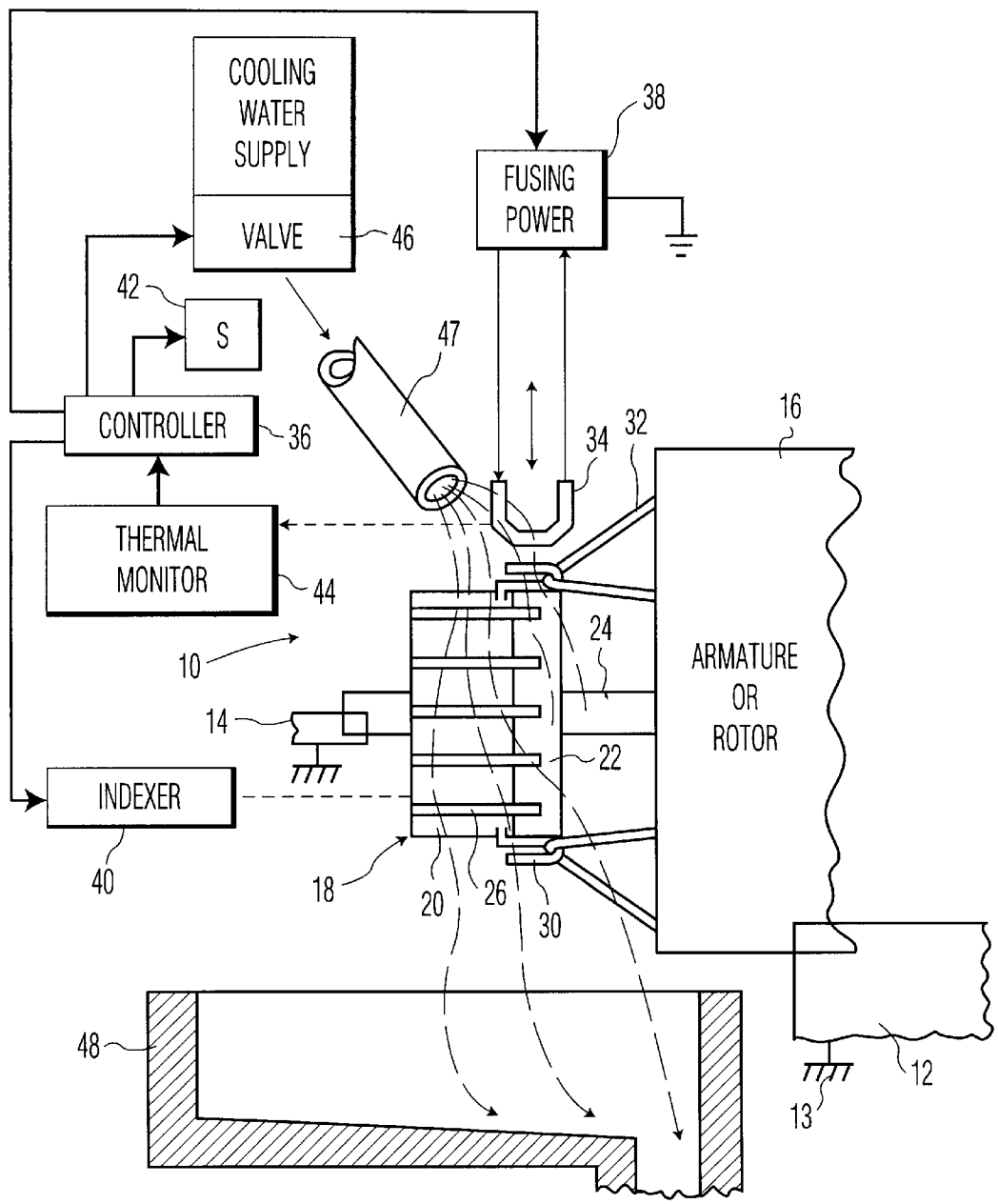
FIG. 1 is a schematic and pictorial representation of one exemplary embodiment of the present invention.

With reference to FIG. 1, an apparatus according to one exemplary embodiment of the present invention includes a fusing machine 10 that includes an armature support 12 and a shaft support 14 mounted on a frame 13 for precisely supporting the work. An armature 16 with a disk or barrel type carbon commutator assembly 18 is delivered to support 12 and 14 by standard mechanisms (not shown). Assembly 18 includes a predetermined number of carbon based commutator segments 20 each soldered to a metallic commutator segment that is held within or to a plastic or phenolic body 22, which in turn is mounted on metal shaft 24 of armature 16. The carbon and the metallic segments are physically and electrically separated by radial slots 26. In one example, the metallic commutator and solder material extend to the walls of the radial slots 26. In another example, these parts do not extend to the slot walls. Each metallic commutator extends from the profile of the carbon and plastic side walls to form an exposed tang 30 at each segment. For clarity, only two tangs are shown in FIG. 1, but it is understood that a tang is formed for each commutator segment in the usual manner. Also conventionally, the armature arrives at the fusing station with the insulated armature winding wires 32 wrapped about and within the U-shaped legs of each tang 30.

It should be understood that armature 16 and commutator assembly 18 can have a great variety of designs that can be used in the method and apparatus according to the present invention. For example, any of the commutator designs appearing in U.S. Patents first above identified, each having the carbon layer soldered to a metal commutator and held to an insulating body and each incorporated herein by reference can be used in the present invention. Other designs could include those commonly known as carbon barrel type commutators.

The apparatus according to one preferred exemplary embodiment of the present invention further includes a single fusing electrode 34 for applying fusing pressure and heat to the tang/wire work. A fusing machine and variety of electrode designs and process suitable and preferable for this function is disclosed in U.S. Pat. No. 5,264,674, owned by JOYAL Products, Inc., and incorporated herein by reference. Alternatively, if desired, a machine with upper and ground electrodes could be used such as that disclosed in U.S. Pat. No. 4,371,772.

Fusing machine 10 preferably further includes a controller 36 for providing the logic control to various functions of machine 10. The principal functional assemblies include a fusing power supply 38 and an indexing mechanism 40 to step rotate each segment and tang 30 to the position under electrode 34. Controller 36 also controls movement of electrode 34 in the direction of the vertical arrows by controlling solenoids or direct current motors 42. Machine 10 further includes a thermal monitor 44 for sensing radiation, eg infra red, indicative of the temperature of the electrode 34 portion in contact with tang 30 during fusing or the temperature of the tang itself during fusing. Monitor 44 feeds controller 36 and the latter controls the amount and duration of the fusing current applied to electrode 34. In addition, controller 36 responds to monitor 44 output to determine when to activate cooling valve 46 for injecting water or other cooling liquid through tube 48. Tube 48 is directed at electrode 34 and assembly 18 and preferably at the joint being fused as described below. Tube 47 delivers either a spray or flood of liquid to the electrode and the joint. A suitable fusing machine and thermal monitor suitable for providing the monitor and general control functions described herein is disclosed in U.S. Pat. No. 4,079,225 and U.S. Pat. No. 4,224,496 incorporated herein by reference. As mentioned in these patents, radiation energy, eg infra red generated with a value indicative of the objects temperature, is sensed and conveyed through optical fiber then converted into electrical signals indicative of the temperature of the object being sensed. As shown in FIG. 1 hereof, thermal monitor 44 sends signals to controller 36 indicative of the fusing electrode temperature and controller 36 controls various units such as power supply 38 to stop fusing current being applied to electrode 34 in response to the fusing electrode reaching a predetermined temperature. Machine 10 further includes a catch basin or trough 48 positioned under the fusing station to collect and drain liquid run-off. Advantageously, in the event small loose bits of metal or insulation remain after fusing, the liquid flow will wash them away from the work and commutator slots and into trough 48 so they can not contaminate or foul the various elements of the commutator.

Figure 5:
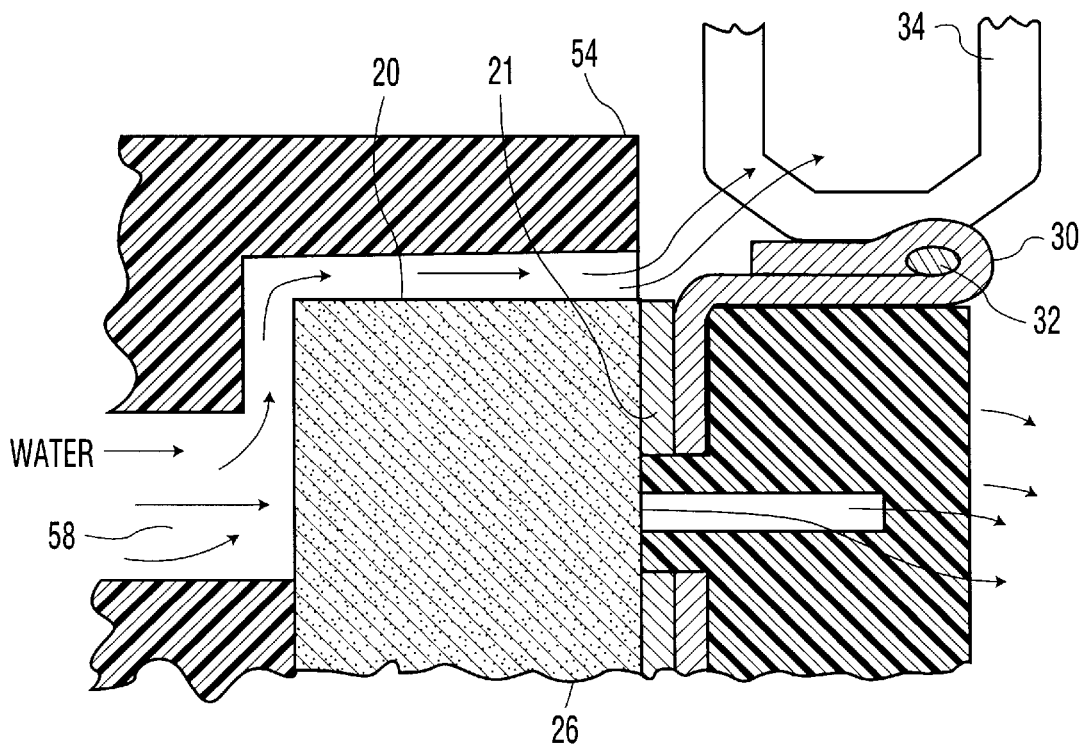
FIG. 5 is an enlarged partial section view of the upper parts of the water applicator and commutator assembly during fusing and water application.
Figure 6:
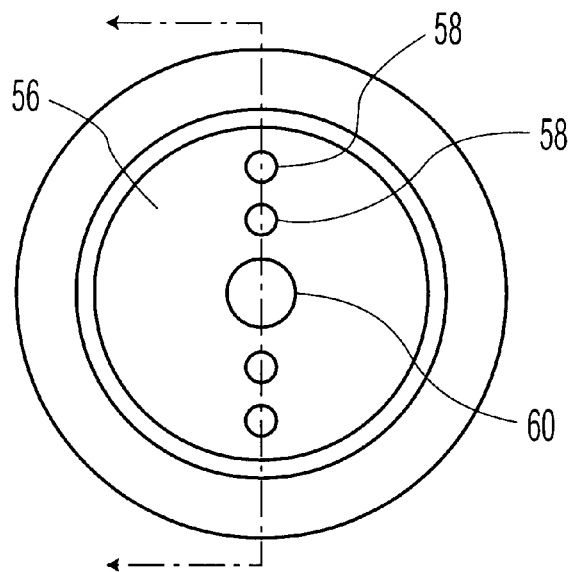
FIG. 6 is a left side view of the water application device of FIG. 5.

In operation, one exemplary embodiment of a method according to the present invention includes moving an armature with carbon track commutator to a fusing position in supports 12 and 14, with one of the tangs 30 located in a fusing position under electrode 34. Controller 36 activates solenoid 42 to drive electrode 34 onto tang 30 and, in turn, tang 30 squeezes or compresses insulated wire 32. When electrode 34 applies a predetermined pressure or force to tang 30, controller 36 activates power supply 38 to apply fusing current through single electrode 34 to heat the same toward high fusing temperatures as described in U.S. Pat. No. 5,264,674 mentioned above, see FIG. 2 at AP representing apply power. With electrode 34 pressing on tang 30, heat builds up rapidly in electrode 34 (FIG. 2 between AP and IW) and is transferred to heat the assembled tang and wire causing the wire insulation under the tang to vaporize or burn away and causing the copper tang and copper wire to soften and form a fusion joint such as shown in FIG. 5 hereof and described below.

Figure 2:
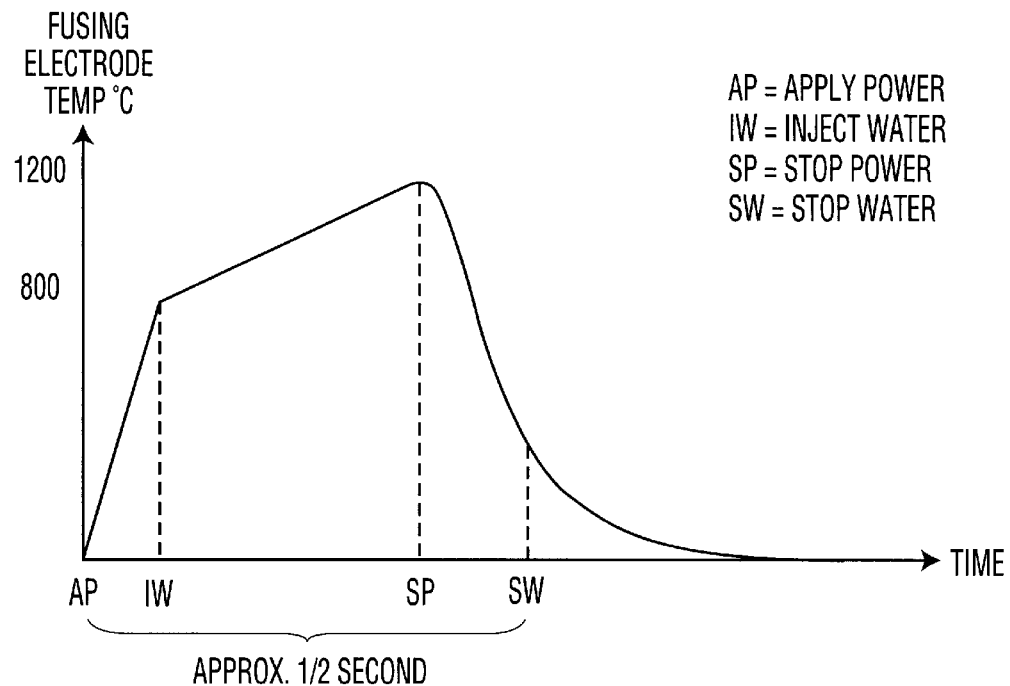
FIG. 2 is a conceptual representation of the temperature change of the lower part of the fusing electrode over a part of the fusing cycle.
Figure 3:
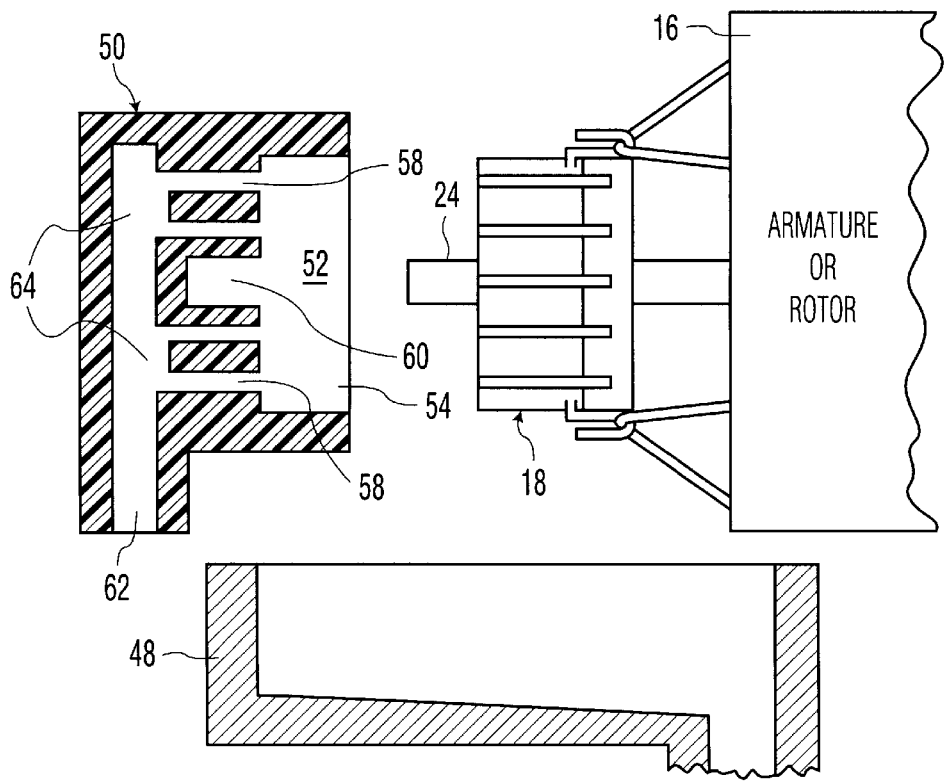
FIG. 3 is a pictorial representation of an alternate embodiment showing in section an alternate cooling water application device.

In response to monitor 44 sensing that the heated electrode or tang has reached a predetermined temperature, such as 800° C., controller 36 activates valve 46 to spray or flood the carbon segments, tang, wire and electrode 34 and likely various other parts of assembly 18 such as the walls of slots 26 near electrode 34. See FIGS. 1 and 2 at point IW representing inject water. Water flowing on carbon segment 20, tang 30 and within slots 26 cools the materials near the solder layer and the solder material itself to prevent the solder of the fused segment from flowing or beading up. Although the flooding water tends to cool the work and electrode, the power applied to electrode 34 and the tang/wire joint is preferably greater than the ability of the water to carry away or dissipate Joules or heat energy. Accordingly, as indicated in FIG. 2 between IW and SP, the temperature of the tang/wire joint continues to rise after IW albeit at a slower rate or reduced slope compared to the phase before IW.

In response to monitor 44 sensing that the heated electrode or tang has reached a second predetermined temperature, such as 1200° C., controller 36 shuts off power supply 38. See stop power (SP) in FIG. 2. Since valve 46 is still open, cooling liquid more quickly reduces the temperature of the tang/wire joint and electrode 34. Controller 36 can activate SP to withdrawn electrode from engagement with the tang/wire joint. In response to monitor 44 sensing the electrode or tang/wire joint has reached a third predetermined temperature such as 200° C., or, if preferred, after a predetermined time period following SP, such as 0.1 seconds, controller 36 shuts valve 46 to stop the water flow. See stop water (SW) in FIG. 2. Controller 36 subsequently activates indexer 40 to rotate assembly 18 to bring the next tang 30 on the next commutator segment under electrode 34. The sequence is repeated until controller 36 determines by counting the number of fusing sequences to a predetermined number for a given motor design. The preferred time between AP and SW in FIG. 2 is less than 0.50 seconds.

With reference to FIGS. 3–6, an alternate embodiment of directing cooling liquid to the electrode and joint includes a cup 50, preferably made of insulating plastic or rubber material but possibly metal, that includes a forward recess 52 defined by continuous annular wall 54 dimensioned to received the assembly 18 and a back wall 56 defining a number of liquid flow openings 58 and a shaft mount recess 60. Cup 50 further defines a water inlet 62 and manifold 64 for communicating with openings 58.

Figure 4:
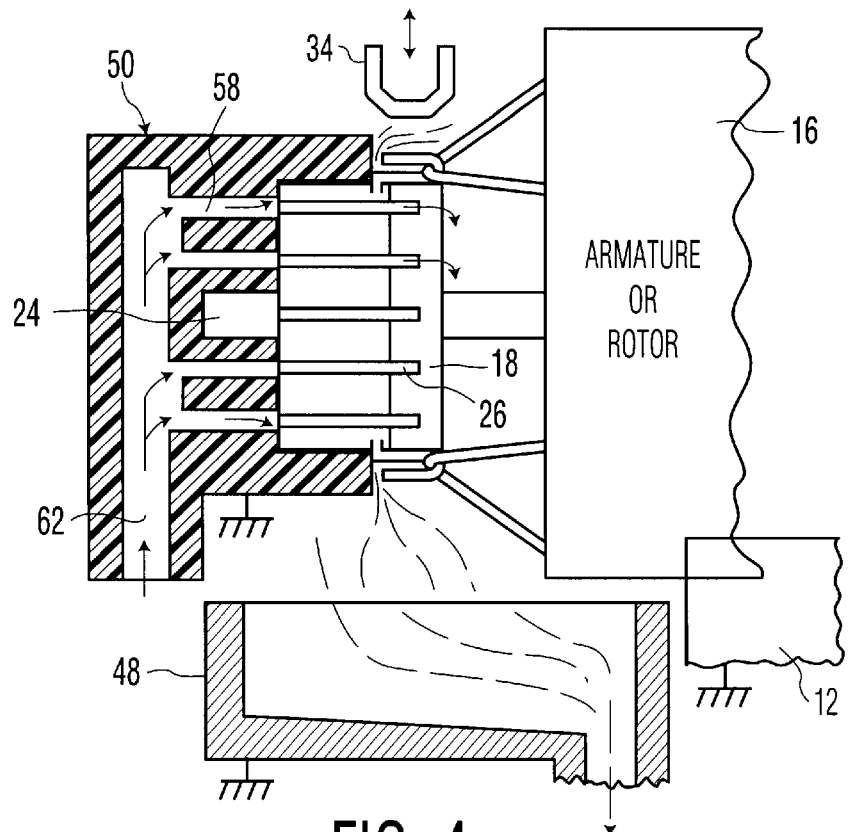
FIG. 4 is the same view as FIG. 3 showing the commutator assembly engaging the cooling water application device during water application.

When armature 16 is moved to the fusing station, shaft 24 seats within mount 60, see FIG. 4, and assembly 18 seats within recess 52 generally as shown. Although the fit of assembly 18 is close within recess 52, the fit at least near the electrode is preferably not a water seal. This will allow some water flow between wall 54 and segments 20 for ejection on to electrode 34 and the joint. See FIG. 5.

Figure 7:
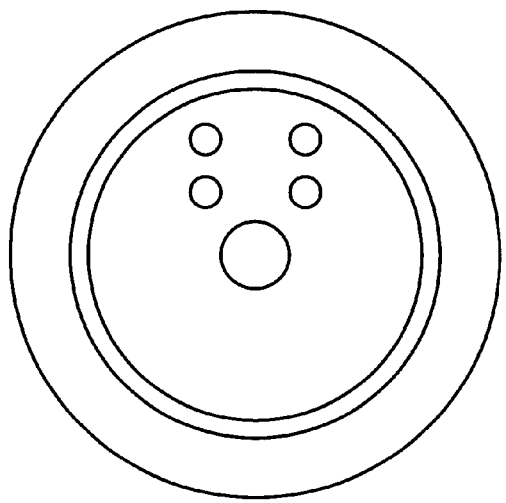
FIG. 7 is the same view as FIG. 6 of an alternate cooling water application device.

With reference to FIGS. 4 and 5, water enters inlet 62, flows to manifold 64, then through openings 58. A portion of the pressurized flow flows between commutator segments 20 and wall 54 and the remainder flows through slots 26, cooling the elements adjacent the slot 26 walls, then exiting the portions of slots 26 extending beyond wall 54. Since carbon is a fairly good heat conductor, this water flow through slots 26 and the surface of segments 20 assure that solder layer 21 will not flow or bead-up as a result of the fusing sequence described above. Also, water preferably sprays or floods on to electrode 34 and the tang and wire fusion joint It will be understood that a great variety of liquid opening patterns and configurations can be employed, such as that shown in FIG. 7 that provides most of the liquid flow to the commutator region nearest the fusing electrode and work locations.

It will also be understood that the drawings are not drawn to scale and they are pictorial and conceptual in character, that various modifications and changes can be made to the herein disclosed examples of method and apparatus without departing from the spirit and scope of the present invention, and that although the exemplary embodiments disclose electric motors, the present invention is also applicable in electric generators and alternators as well.

I claim:

1. A method of making an electric machine having an armature assembly and a commutator subassembly that includes commutator segments, each commutator segment having a carbon based segment secured by solder material to a metal segment, each commutator segment being electrically separated from other commutator segments, each metal segment having a first portion for holding an armature wire portion in a fusing position, comprising:

moving a fusing electrode to compress together the first portion and the armature wire portion, applying current through the electrode to raise the electrode temperature to heat the first portion and wire portion to form a fused metal-to-metal joint between the first portion and the wire portion, and, while applying electrode current, removing heat from the metal segment being fused to reduce the heat transfer from the first portion to the solder material of the commutator segment being fused, said removing heat being sufficient to prevent heat transfer to the solder material that would cause the solder material to flow or bead and thereby reduce the securement and conductivity provided thereby between said commutator segment and said carbon based segment.

2. A method of claim 1 wherein removing heat includes applying cooling liquid to the commutator segment being fused.

3. A method of claim 1 further comprising applying cooling liquid to the commutator segment being fused and to the electrode for reducing the rate of electrode temperature rise while applying current.

4. A method of claim 3 wherein
applying cooling liquid comprises one of flooding and spraying liquid.

5. A method of claim 3 wherein
applying cooling liquid includes flowing liquid within the slots bounding the commutator segment being fused.

6. A product made by the process of claim 1.

7. A method of making an electric machine having an armature assembly and a commutator subassembly that includes commutator segments, each commutator segment having a carbon based segment secured by solder material to a metal segment, each commutator segment being electrically separated from other commutator segments, each metal segment having a first portion for holding an armature wire portion in a fusing position, comprising:

moving a fusing electrode to compress together the first portion and the armature wire portion, applying current through the electrode to raise the electrode temperature to heat the first portion and wire portion to form a fused joint between the first portion and the wire portion, while applying electrode current, removing heat from the metal segment being fused to reduce the heat transfer from the first portion to the solder material of the commutator segment being fused, applying cooling liquid to the commutator segment being fused and to the electrode for reducing the rate of electrode temperature rise while applying current, and sensing the temperature of one of the first portion and the electrode, and initiating the application of cooling liquid in response to one of the first portion and electrode reaching a first predetermined temperature.

8. A method of claim 7 further comprising stopping the application of current to the electrode after the fused joint is formed.

9. A method of claim 8 further comprising continuing the application of cooling liquid after the electrode current has stopped to rapidly cool the electrode and the fused joint.

10. A method of claim 7 further comprising stopping the application of current to the electrode when the temperature of one of the first portion and the electrode reaches a second predetermined temperature, the second predetermined temperature being higher than the first predetermined temperature.

11. A product made by the process of claim 4.

* * * * *

UNITED STATES PATENT AND TRADEMARK OFFICE
CERTIFICATE OF CORRECTION

PATENT NO. : 5,910,259
DATED      : June 8, 1999
INVENTOR(S): Allan S. Warner

It is certified that error appears in the above-indentified patent and that said Letters Patent is hereby corrected as shown below:

Claim 11, change "claim 4" to ---claim 7---.

Signed and Sealed this

Fifth Day of October, 1999

*Attest:*

Q. TODD DICKINSON

*Attesting Officer*     *Acting Commissioner of Patents and Trademarks*